United States Patent [19]

Rouverol

[11] 3,982,445
[45] Sept. 28, 1976

[54] HIGH TORQUE GEARING

[76] Inventor: William S. Rouverol, 1521 Shattuck Ave., Berkeley, Calif. 94709

[22] Filed: Sept. 2, 1975

[21] Appl. No.: 609,360

[52] U.S. Cl. ................................................. 74/462
[51] Int. Cl.² ........................................... F16H 55/06
[58] Field of Search ............................. 74/462, 460

[56] References Cited
UNITED STATES PATENTS

| | | | |
|---|---|---|---|
| 3,180,172 | 4/1965 | Leggatt | 74/462 |
| 3,371,552 | 3/1968 | Soper | 74/462 |
| 3,709,055 | 1/1973 | Grove | 74/462 |

Primary Examiner—Leonard H. Gerin
Attorney, Agent, or Firm—Gordon Wood

[57] ABSTRACT

Novikov gearing obtains its exceptional tooth surface load capacity by using concave-convex circular arc profiles of nearly the same radii, so that the contact area between mating teeth is very large and the Hertzian stress low. Because the centers of these arcs are very close together, a small error in center-distance produces excessive changes in pressure angle and overloads the tips of the concave teeth. The subject invention eliminates this problem by using profile curves having a radius of curvature that increases with distance from the pitch circle. The discrete arc centers of Novikov gearing are replaced by continuous evolute curves which are positioned to be tangent to the pressure line near the point where it passes through the pitch point. This allows much closer profile conformity for a given center-distance error, reducing surface stresses and increasing torque capacity.

14 Claims, 4 Drawing Figures

HIGH TORQUE GEARING

This patent specification is intended to supplement and expand the disclosures in U.S. patent application Ser. No. 529,298, now U.S. Pat. No. 3,937,098. That application disclosed a type of Novikov gearing wherein the tooth profiles were composed of mating concave and convex curves whose radii of curvature increased with distance from the pitch circles of their respective gears. Subsequent to the filing of that patent application, the applicant has discovered that there is a particular positioning of the profile curves that allows the gearing to have greater profile conformity and tooth flank load capacity than Novikov gearing, without sacrificing the primary advantage of variable-radius concave-convex gearing, which is increased tolerance to center-distance error.

The object of the invention is therefore to provide a new type of concave-convex gear that will have a torque capacity greater than that of Novikov gearing and be less sensitive to center-distance error.

The means to achieve these and other objects and advantages of the invention will be evident from the drawings and specification that follows.

Figure 1:
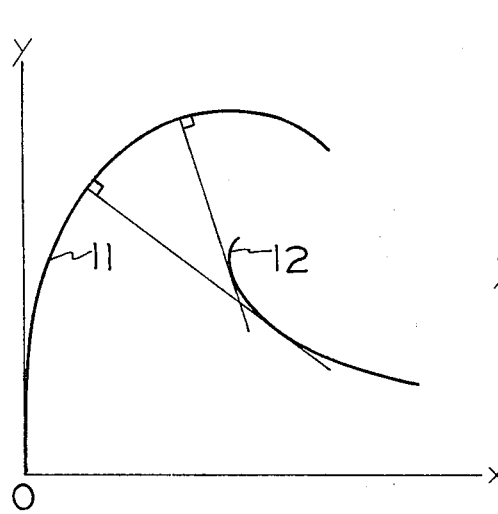
FIG. 1 shows a curve with a radius of curvature that diminishes with distance from the origin, together with its evolute.

In detail and referring to the figures, FIG. 1 shows one of the large number of curve forms that are useable in gear teeth embodying the invention. All plane curves except a circle and a straight line have portions for which the radius of curvature diminishes. Such curves all have evolutes (loci of the centers of curvature) that are continuous in some segment where the curvature is diminishing, and when plotted these curves and their evolutes will look more or less like the curve 11 and its evolute 12 shown in FIG. 1.

The particular curve 11 shown in FIG. 1 is one called a "railway transition spiral", and it has the general equation $$r = C/s^m \qquad (1)$$

where $r$ is the radius of curvature, $C$ is a constant, $s$ is the distance along the curve from the origin, and $m$ is an exponent greater than 0. For most applications $m$ is taken as unity, in order to simplify calculation of the tooth stresses. In this case $$r = C/s \qquad (2)$$

Figure 2:
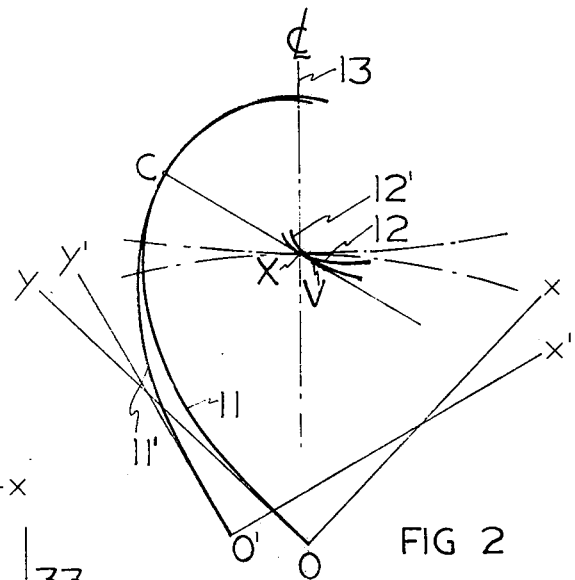
FIG. 2 shows a curve of the type shown in FIG. 1 in the positions in the transverse plane that define the convex and concave profiles for a pair of mating gears.

In FIG. 2 a curve of the type shown in FIG. 1 and defined by Equation 2 is shown in two positions or "traces", 11, 11', tangent at a point C and with origins at O and O' respectively. One trace 11 of the curve has been rotated with respect to a fixed line 13 a few degrees further than the other 11'. Because the distance $s$ along the curve from C to O is slightly greater than that from C to O', it will be evident from Equation 2 that the radius of curvature at point C will be slightly greater for trace 11' than it is for trace 11. Consequently the distance from point C to the point of tangency V for the evolute 12' of trace 11' will be slightly larger than that to the corresponding point X for the evolute 12 of trace 11.

Figure 3:
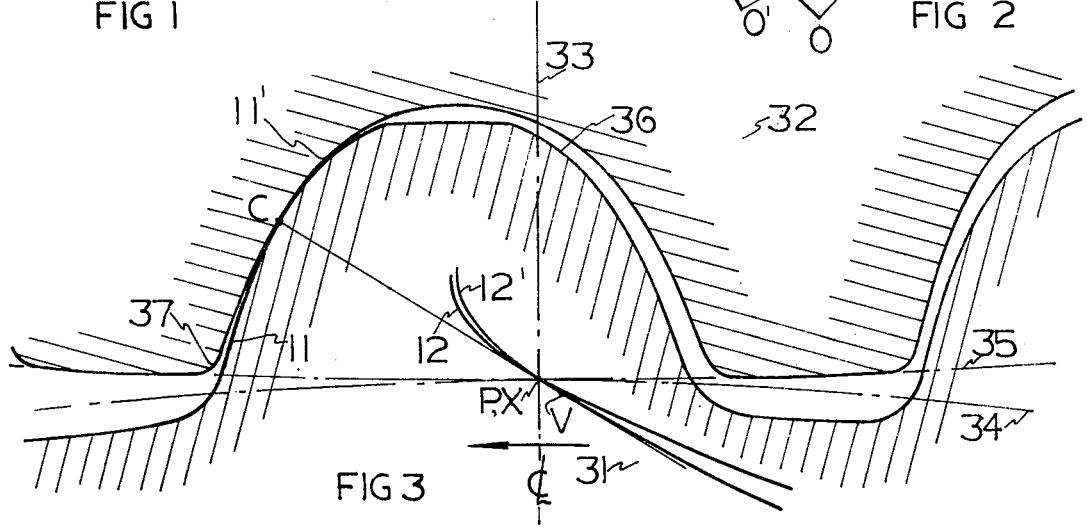
FIG. 3 shows segments of the same curves used for transverse plane profiles of concave and convex teeth in a pair of mating gears.

FIG. 3 shows how segments of the curve traces 11 and 11' are used for the convex and concave tooth profiles of a pair of mating gears comprising a pinion 31 and a gear 32 mounted on center line 33 and having pitch circles 34, 35 respectively tangent at pitch point P. In order for the teeth 36, 37 to mesh without interference, the centers of curvature X and V of point C on traces 11 and 11' respectively, should be located near the pitch point P. The line CP will then be the pressure line and evolutes 12 and 12' will be tangent to it. Usually X is placed substantially at P, and V is located a small distance beyond it, as shown. The distance PV varies directly with the allowable strain of the tooth materials, and the angles through which the y-axis and y'-axis in FIG. 2 are turned relative to the fixed line 13 vary inversely with the number of teeth on the pinion 31.

The point C is called the "culmination point," because the tooth compression is at a maximum there and falls off from that point in both the radial and axial directions. In the gearing disclosed herein the position of the culmination point is much less affected by errors in center-distance than it is in the case of Novikov gearing. In Novikov gearing the tooth profiles are circular arcs and if the distance between these arc-centers (corresponding to XV in FIGS. 2 and 3) is small, then a small increase in center-distance will cause the line between these arc-centers, which controls the pressure angle, to be drastically reduced. This shifts the culmination point down to the tip of the concave tooth and leads to noisy operation and tooth breakage.

The present invention solves this problem by replacing the discrete arc centers of Novikov gearing by continuous curved evolutes (12, 12'), and when these are shifted by center-distance errors, the pressure line which is tangent to both of them, rotates only slightly and the location of the culmination point is changed very little. This means that materials with limited allowable strain, such as unhardened steels, can be used without the close conformity required to insure full tooth utilization introducing overly exacting requirements with regard to center-distance tolerances.

There is in addition one other characteristic of the profile configuration herein disclosed that is of considerable importance to gear designers. This concerns the fact that mating profiles based on Equation 2, even though both of them have a varying radius of curvature, have a constant relative radius of curvature throughout the full lengths of the transverse profiles, just as circular arcs do. This can be confirmed by substituting Equation 2 into the general expression for relative radius of curvature R which is:

$$R = \frac{1}{\frac{1}{r_1} + \frac{1}{r_2}} \qquad (3)$$

where the subscripts 1 and 2 refer to the pinion and gear profiles respectively and $r_2$ is concave and therefore negative. The use of Equation 2 in this expression gives the following equation:

$$R = \frac{C}{s_1 - s_2} \quad (4)$$

For any points on the convex and concave profiles that are opposite to one another, the arc distances $s_1$ and $s_2$ will differ by a very nearly constant amount, which is the distance from O to O' in FIG. 2. Since C is a constant, the relative radius of curvature R must therefore also be constant. The importance of this is that the only equations available for calculating the contact stresses between mating teeth, which are the Hertz equations, are only applicable if the relative radius of curvature between the impinging surfaces is constant.

The invention is applicable to all forms of parallel-, intersecting-, and skew or crossed-axis gearing for which it may be desired to increase torque capacity. Ideally the teeth should be helical or spiral with at least one tooth overlap to insure continuity of action, although spur teeth are feasible if there are a large number of teeth on the pinion.

Figure 4:
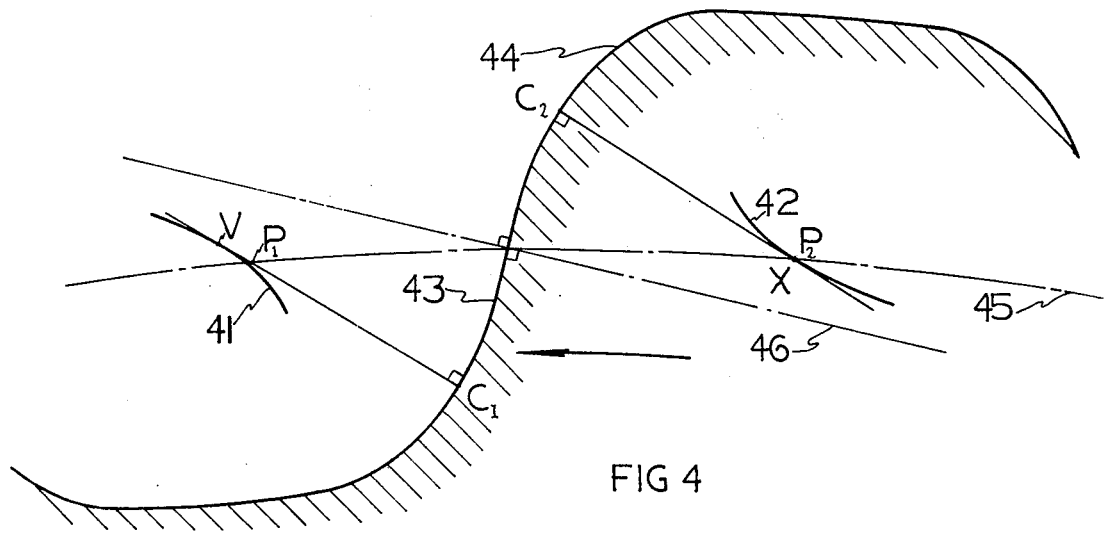
FIG. 4 shows the transverse plane profile of a gear tooth having both convex and concave portions.

It will also be evident that the invention may be applied to concave-convex teeth that have curvature in opposite directions on opposite sides of the pitch surface as shown in FIG. 4. The placement of the profile evolutes 41, 42 with respect to the pitch point is the same in the case of the all-addendum tooth forms shown in FIG. 3, but there will, of course, be separate evolutes 41, 42 for the portions of the profile curves 43, 44 on opposite sides of the pitch surfaces, and separate culmination points $C_1$, $C_2$ for each such profile position.

In FIG. 4 the mating profile is omitted in the interest of clarity, but it will be understood that it will be formed in the manner prescribed in FIG. 3, so that when point $P_1$ (where the pressure line $C_1P_1$ intersects the pitch circle 45) is at the pitch point, the point $C_1$ will be the culmination point, and when the profile rotates a bit further, the point $P_2$ (where the pressure line $C_2P_2$ intersects the pitch circle 45) will occupy the pitch point, at which time $C_2$ will be the culminaton point, substantially as explained in U.S. patent application Ser. No. 529,298. There is thus one culmination point $C_1$ that is reached before the profile reaches the pitch point, and another $C_2$ reached after the pitch point is passed, as in FIG. 3. It will be noted that the centers of curvature V and X of the profile at the culmination points $C_1$ and $C_2$ respectively are positioned to be adjacent to the pitch point at the instant these culmination points are reached. (The word "adjacent" is used rather than "at," because the radius of curvature at a culmination point should be slightly larger for the concave profile portion than that for its convex mate, as indicated in FIG. 3).

In these inflected profile configurations the amount of rotation of the curve traces 11, 11' will be much smaller than that shown in FIG. 2 for the all-addendum configuration of FIG. 3. This allows the profile origins O and O' in FIG. 2 to be located near the pitch surfaces, so that if desired, profile curves according to Equation 1 may have a point of inflection where the radius of curvature goes to infinity because $s$ goes to zero at the origin. This is quite advantageous with regard to surface stresses. In such configurations the two evolutes 41, 42 will have common asymptote 46.

In general the relative rotation of the profile curve traces 11, 11' should be sufficient to produce a relative radius of curvature at the culmination point such that when the gears are fully loaded, the contact areas will be substantially tangent to the addendum surfaces of both gears. This insures that the torque capacity of the gears can be calculated with reasonable accuracy, and the tooth tips will not be either unused or overloaded.

In the following claims the term "pitch line" is used in the same way it is used throughout the gear industry, namely to mean the line of tangency between the pitch surfaces of the mating gears. It should be noted that this is at variance with the incorrect definition given in Webster's New International Dictionary (Second Edition). Also, the phrase "culmination position" means the position occupied by a pair of mating profiles when they are in contact at a culmination point.

I claim:

1. In a pair of toothed gears,
mating teeth formed to have active profiles perpendicular to the pitch line of said pair which have at least one culmination point substantially removed from said pitch line,
said profiles of at least one of said pair having a variable-curvature portion with curvature that increases with distance from the pitch surface of said one of said pair,
one of said active profiles having a convex portion engaging a concave portion on the other of said active profiles,
said concave portion having a slightly larger radius of curvature at said culmination point than said convex portion,
the evolute of said variable-curvature portion being tangent to a line passing through said culmination point and the pitch point of said pair at a point adjacent to said pitch point.

2. A pair of toothed gears according to claim 1 wherein said teeth extend across the rims of said gears at a sufficient angle with respect to said pitch line to produce at least one tooth overlap in the face width of said pair.

3. A pair of toothed gears according to claim 1 wherein the relative radius of curvature for points on said profiles at equal distances from said culmination point is substantially constant.

4. A pair of toothed gears according to claim 1 wherein said variable-curvature portion comprises a curve of the form $r_1 = C/s^m$, where $r$ is the radius of curvature, $s$ is the distance along the curve from the origin, $m$ is an exponent greater than zero, and $C$ is a constant.

5. A pair of toothed gears according to claim 4 wherein said exponent is unity.

6. A pair of toothed gears according to claim 4 wherein said profiles of both of said pair have a variable-curvature portion.

7. A pair of toothed gears according to claim 6 wherein said variable-curvature portion of said profiles of both of said pair comprises a curve of said form.

8. A pair of toothed gears according to claim 7 wherein the value of said constant C and said exponent m is the same for both said profiles, said curve defining said convex profile being rotated through a greater angle with respect to a plane containing the axes of said pair than said curve defining said concave profile.

9. A pair of toothed gears according to claim 8 wherein said exponent m is unity.

10. A pair of toothed gears according to claim 1 wherein said profiles have a relative radius of curvature at said culmination point that produces areas of contact between mating teeth that are substantially tangent to the addendum surfaces of said teeth when said gears are transmitting the maximum allowable torque.

11. A pair of toothed gears according to claim 1 wherein said profiles extend on opposite sides of the pitch surfaces of said pair, and are oppositely curved on opposite sides of said pitch surfaces.

12. A pair of toothed gears according to claim 11 wherein said profiles have two culmination points, one on each side of the plane containing the axes of said pair.

13. A pair of toothed gears according to claim 12 wherein said profile portions extending on opposite sides of the pitch surface of each of said pair each have a continuous curved evolute that is tangent to a line passing through each said culmination point and the pitch point of said pair at a point adjacent to said pitch point when each said profile portion is in the culmination position.

14. A pair of toothed gears according to claim 13 wherein said profile portions meet at a point of infinite radius of curvature and said evolutes have a common asymptote.

* * * * *